US005528012A

United States Patent [19]

Schlienger

[11] Patent Number: 5,528,012

[45] Date of Patent: Jun. 18, 1996

[54] APPARATUS AND METHOD FOR STARTING A PLASMA ARC TREATMENT SYSTEM

[75] Inventor: Max P. Schlienger, Ukiah, Calif.

[73] Assignee: Retech, Inc., Ukiah, Calif.

[21] Appl. No.: 218,791

[22] Filed: Mar. 28, 1994

[51] Int. Cl.[6] .................... B23K 10/00

[52] U.S. Cl. .................... 219/121.37; 219/121.38; 219/121.59; 219/121.43; 373/22; 266/200; 75/959

[58] Field of Search .................... 219/121.36, 121.43, 219/121.59, 121.37, 121.38; 75/528, 959, 10.61, 10.19–10.28, 392; 266/225, 207, 200, 205; 373/18–22, 27–29

[56] References Cited

U.S. PATENT DOCUMENTS

| | | | |
|---|---|---|---|
| 4,617,671 | 10/1986 | Lugscheider et al. | 373/22 |
| 4,918,282 | 4/1990 | Cheek | 219/121.37 |
| 4,982,410 | 1/1991 | Mustoe et al. | 373/22 |
| 5,174,810 | 12/1992 | Dosaj et al. | 75/10.61 |
| 5,199,973 | 4/1993 | Funk, Sr. | 75/392 |
| 5,378,261 | 1/1995 | Aizatulov et al. | 75/528 |

*Primary Examiner*—Mark H. Paschall
*Attorney, Agent, or Firm*—Townsend and Townsend and Crew

[57] ABSTRACT

An ignitable material is positioned in contact with a slag contained within a plasma arc treatment system having an electrode and an electrical ground. The slag is initially at a temperature below a conducting temperature at which the slag will conduct electricity between the electrode and grounding network. The ignitable material has a self-sustaining reaction which releases heat energy upon ignition. The ignitable material is ignited with a pilot arc thereby heating at least a portion of the slag to the conducting temperature so that an arc between the electrode and grounding network can be sustained.

23 Claims, 3 Drawing Sheets

APPARATUS AND METHOD FOR STARTING A PLASMA ARC TREATMENT SYSTEM

BACKGROUND OF THE INVENTION

The present invention relates to methods and apparatus for starting a plasma arc treatment system. Plasma arc treatment systems advantageously attain high temperatures (10,000° C.–15,000° C.) with a non-contaminating electrical heat source and are used in applications such as metal melting, powder production, and hazardous waste incineration.

In plasma arc treatment chambers, a plasma torch transfers electrical energy through a stream of ionized gas so that the gas becomes an electrical conductor. The commonly owned U.S. Pat. No. 4,912,296, for example, discloses an advantageous construction for a plasma torch incinerator. U.S. Pat. No. 4,770,109 and U.S. Pat. No. 5,136,137, both by the inventor of this application and also commonly owned, disclose and claim reactors for the incineration and melting of all types of materials, particularly hazardous waste, for which the invention of this application is particularly useful. The disclosure of the commonly owned patents is incorporated herein by reference. Other patents relating to the field of materials incineration and melting include U.S. Pat. Nos.:

| | |
|---|---|
| 3,599,581 | 4,432,942 |
| 3,779,182 | 4,582,004 |
| 4,181,504 | 4,615,285 |
| 4,326,842 | 4,918,282 |

and British Patent No. 1,170,548.

When used as a hazardous waste incinerator, the plasma torch raises the temperature of the waste materials to such high levels that the waste materials chemically break down (pyrolysis). The breakdown is enhanced by maintaining an atmosphere of appropriate gas in the incinerator. As a result, the residues are usually harmless gases and solids which can be suitably removed from the incinerator. The term hazardous waste as used herein refers to any nuclear, toxic, chemical and/or biological waste.

Generally speaking, there are two types of plasma torches: non-transferred and transferred arc torches. In non-transferred arc torches, the electrical potential is contained entirely within the plasma torch; for example, between two coaxial rings so that an electrical arc forms in the annular space between the coaxial rings. A gas is passed through the annular area and emitted from an end of the torch.

In transferred arc torches, the torch acts as one side of the electrical field and the other side of the field is exterior of the torch and spaced apart from the torch. Transferred arc torches are preferable since they are more efficient and attain higher operating temperatures than non-transferred arc torches. U.S. Pat. No. 5,136,137, by the inventor of this application and commonly owned, discloses a transferred arc torch. Referring to FIG. 1 of U.S. Pat. No. 5,136,137, the reactor includes a hollow containment vessel. A conical, electrical conducting member is attached to the bottom of a drum and a plasma torch is mounted to the top of the vessel. A high voltage terminal is coupled to the torch so that an electrical potential exists between the conducting member and torch. During operation, an arc is sustained between the torch and electrical conducting member forming a plasma plume.

Plasma arc treatment systems typically operate with a liquid slag in the drum. The molten slag insulates the refractory from the hot plasma and can also be used to increase the conductivity between the torch and the grounding network. When the materials being treated are inorganic, the molten slag is usually an effective conductor. If only organic matter is being treated, slag formers, such as sand and soda ash, may be added to increase the conductivity of the slag.

When the plasma arc treatment system is shut down, an amount of the slag is left in the drum to form the slag for a subsequent use. During the down time the slag cools and may solidify. As the slag temperature drops, the conductivity of the slag also decreases. A problem that occurs when starting the plasma arc treatment system is that the conductivity of the slag may have dropped to a level which will not sustain an arc between the torch and grounding network. In order to start the treatment system and sustain an arc, the slag must be heated to increase the conductivity.

A conventional method of heating the slag is with an oxyacetylene torch or a non-transferred plasma arc torch. A problem with the conventional method of heating the slag is that a considerable amount of time is required to heat the slag. The torch is generally applied to the surface of the slag and the heat tends to dissipate throughout the slag and containment vessel.

SUMMARY OF THE INVENTION

The present invention solves the problems with prior art apparatus and methods for starting a plasma arc treatment system by providing an ignitable material positioned in contact with the slag, which, upon ignition, releases a relatively high amount of heat energy in a short time so that heat dissipation losses are minimized and the plasma arc treatment system can be started quickly. The ignitable material has a self-sustaining reaction that releases the heat energy upon ignition. The heat energy released by the self-sustaining reaction heats the slag to a conducting temperature at which the slag conducts electricity between an electrode and an electrical ground of the plasma arc treatment system.

The self-sustaining reaction may be any exothermic reaction but is preferably an aluminothermic process. In an aluminothermic reaction, a metallic oxide is combined with finely divided aluminum powder and the mixture is ignited. Upon ignition, the aluminum is oxidized and the metallic oxide is reduced to metal. A preferred mixture is aluminum powder and iron oxide, otherwise known as thermite, although any other metallic oxide may be used. An advantage of using thermite is that the ignition temperature is relatively high, in the order of 1000° C. and, therefore, the mixture is not susceptible to inadvertent ignition. As an example of the aluminothermic process, the thermite reaction is:

$$8Al+3Fe_3O_4 \rightarrow 9Fe+4Al_2O_3+\text{heat energy}$$

The ignitable material is preferably ignited by a pilot arc extending from the electrode toward the ground; however, any other ignition method may be used. The aluminothermic reaction progresses rapidly and has a reaction temperature of about 2500° C. The heat from the reaction advantageously heats the slag quickly so that the heat is not dissipated throughout the slag but, instead, is concentrated in a small area.

The ignitable material may also include a non-reactive material which is not consumed in the self-sustaining reaction. The non-reactive material absorbs part of the heat energy produced by the reaction thereby reducing the reaction rate and the overall amount of heat released into the slag. The non-reactive material may be any material which is not consumed in the reaction but is preferably welding slag containing a percentage of free iron. It may be preferred to add the non-reactive material when the thickness of the slag is small or the slag is already at an elevated temperature.

The apparatus and method of the present invention is also adaptable for removing slag plugs in orifices of a plasma arc treatment system. The ignitable material is positioned proximate the slag plug and ignited to melt the slag plug. An advantage of the present method and apparatus is that the slag plug is liquified quickly with minimal heat dissipation losses.

Other features and advantages of the invention will become apparent from the following description in which the preferred embodiments have been set forth in detail in conjunction with the accompanying drawings.

DESCRIPTION OF THE PREFERRED EMBODIMENT

Figure 1:
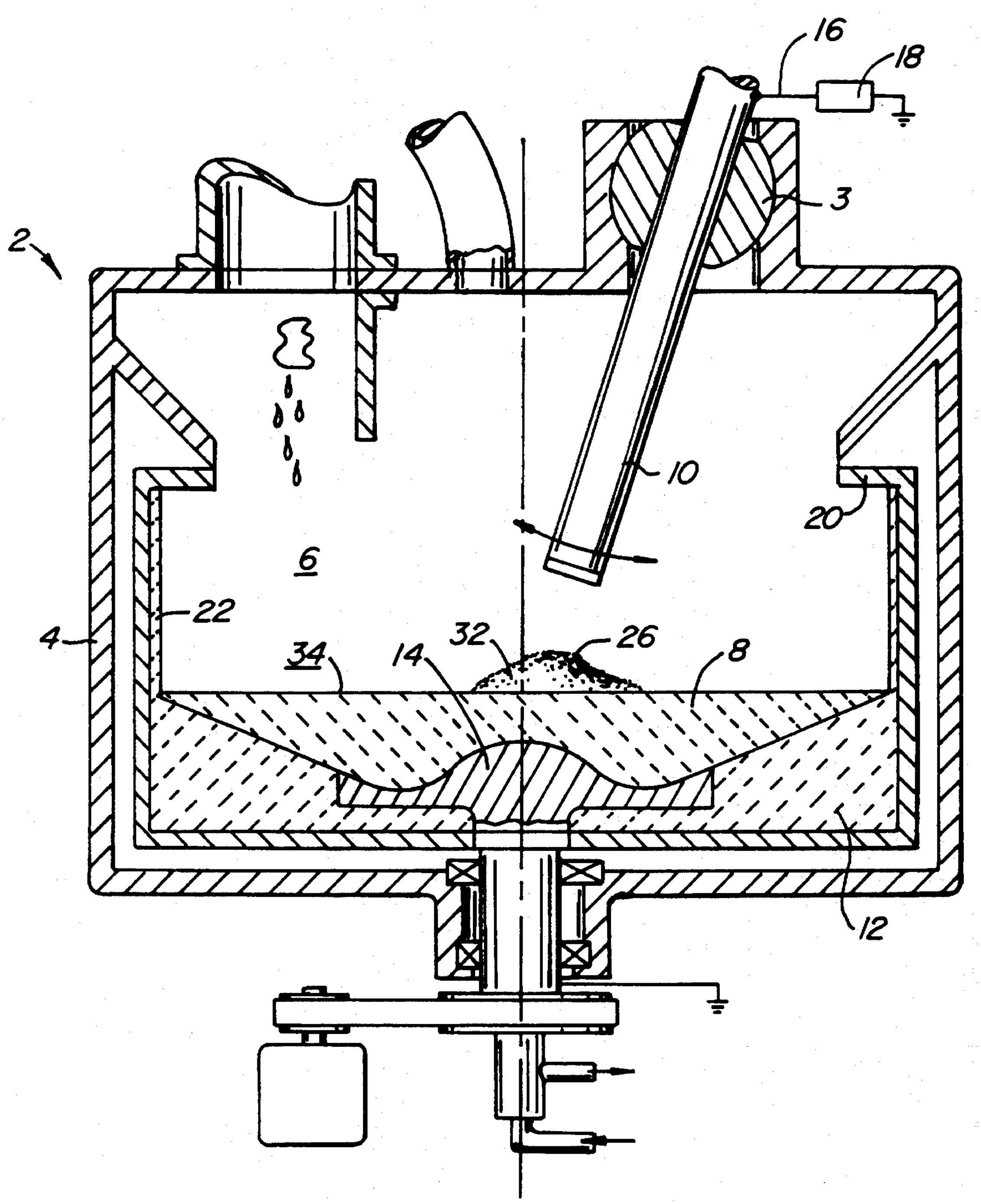
FIG. 1 is a cross-section of a plasma treatment system containing a slag and an ignitable material.

A plasma arc treatment system 2 includes a housing 4 and an interior space 6 containing a slag 8 (FIG. 1). The plasma arc treatment system 2 also includes an electrode 10 and an electrical grounding network 12. The electrical grounding network preferably includes a conical conducting member 14. A high voltage terminal 16 of an electrical power source 18 is electrically coupled to the electrode 10. During operation, an arc is sustained between the electrode 10 and ground network 12.

A material receiving drum 20 is mounted within the interior space 6. The material receiving drum 20 is preferably rotatable with respect to the housing 4 but may also be a fixed with respect to the housing 4. The sides and bottom of the material receiving drum 20 are covered by an appropriate, e.g., conductive refractory 22. The conductive refractory 22 is preferably made of graphite, carbon, silicon carbide and/or tin oxide. The conductive refractory 22 max also include a steel matrix for increasing the conductivity of the refractory 22.

The slag 8 is at a starting temperature which is lower than a conducting temperature (FIG. 1). The term conducting temperature, as used herein, is the temperature at which the slag 8 conducts electricity between the electrode 10 and the electrical ground 12 so that an arc can be sustained between the electrode 10 and the electrical ground 12. As shown in FIG. 1, the slag 8 is solid, however, the slag 8 may also be liquid at the starting temperature. Furthermore, the slag 8 may be solid, partially solid, or liquid at the conducting temperature depending on the conducting characteristics of the slag 8 and the operating parameters of the plasma arc treatment system 2.

An ignitable material 26 is positioned in the interior space 6 and in contact with the slag 8. The ignitable material 26 may be introduced into the interior space 8 using any conventional method. The ignitable material 26 is selected to have a self-sustaining, exothermic reaction upon ignition. The self-sustaining reaction may be any exothermic reaction but is preferably an aluminothermic process. A preferred metallic oxide is iron oxide although any other metallic oxide may be used.

Figure 2:
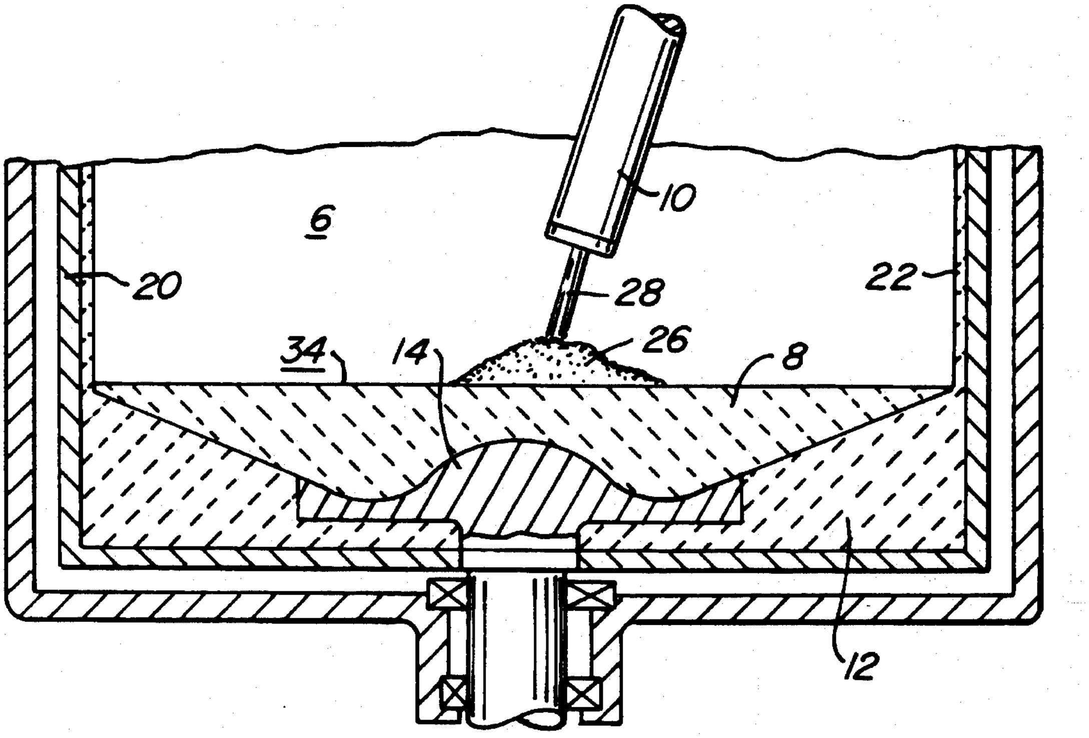
FIG. 2 is the plasma treatment system of FIG. 1 with the ignitable material being ignited by a pilot arc extending from an electrode.
Figure 3:
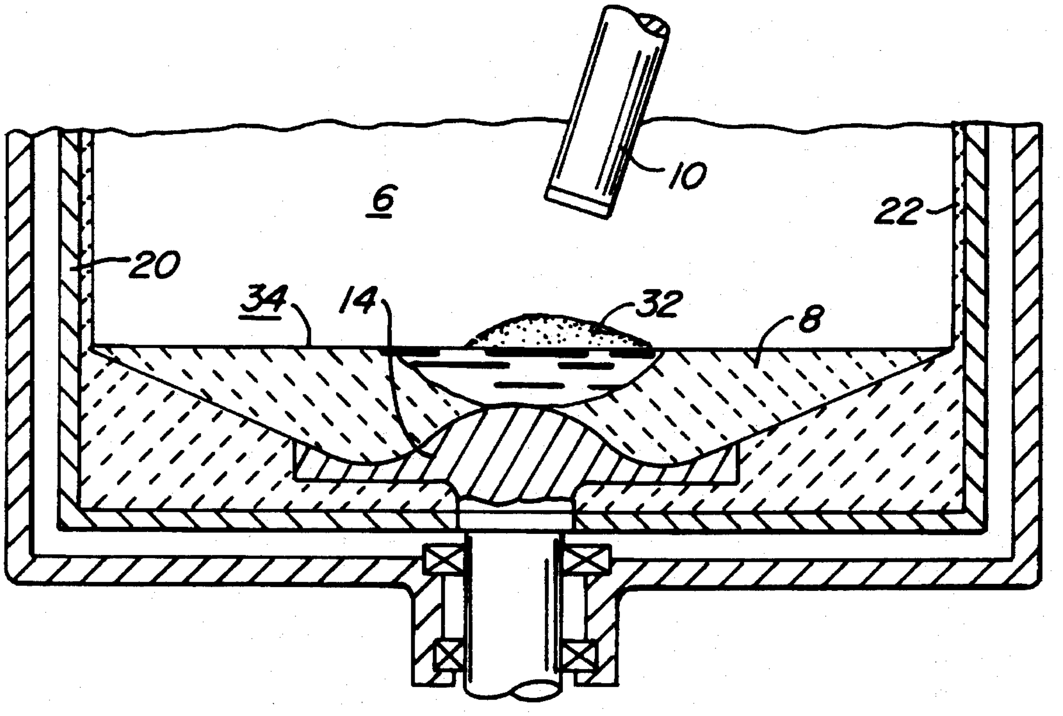
FIG. 3 is the plasma treatment system of FIG. 1 with an area of the slag at a conducting temperature.

The ignitable material 26 is preferably ignited by a pilot arc 28 extending from the electrode 10 toward the ground network 12 (FIG. 2). A supplemental electrode (not shown) may also be provided for striking a pilot arc 28. The ignitable material 26 may also be ignited using any other conventional ignition method including an oxyacetylene torch, a non-transferred plasma arc torch or by simply providing a slag 8 which is at a temperature which will ignite the material. A pilot arc path, as defined by the pilot arc 28 shown in FIG. 2, may be moved by pivoting the electrode 10 about a joint 30.

Upon ignition, the self-sustaining reaction proceeds and heats the slag 8. The self-sustaining reaction preferably has a fast reaction rate and releases a high amount of heat energy so that heat dissipation losses are minimized. The ignitable material 26 is preferably ignited by a temperature of at least 1000° C. so that inadvertent ignition is not a problem. The self-sustaining reaction also preferably has a reaction temperature of at least 2000° C. and most preferably at least 2500° C. Thermite, for example, has an ignition temperature of about 1500° C. and a reaction temperature of about 2500° C.

If it is desired to reduce the reaction rate, a non-reactive material 32 can be added which is not consumed in the self-sustaining reaction. The non-reactive material 32 absorbs part of the heat energy released by the self-sustaining reaction thereby reducing the reaction rate and the overall heat energy released into the slag 8. The non-reactive material 32 may be any material but is preferably welding slag containing a percentage of free iron. A reduction in reaction rate or amount of heat released into the slag may be desired when the slag is still relatively hot or when the slag thickness between a surface of the slag 34 and the refractory 22 or conical electrode 14 is relatively small.

Figure 4:
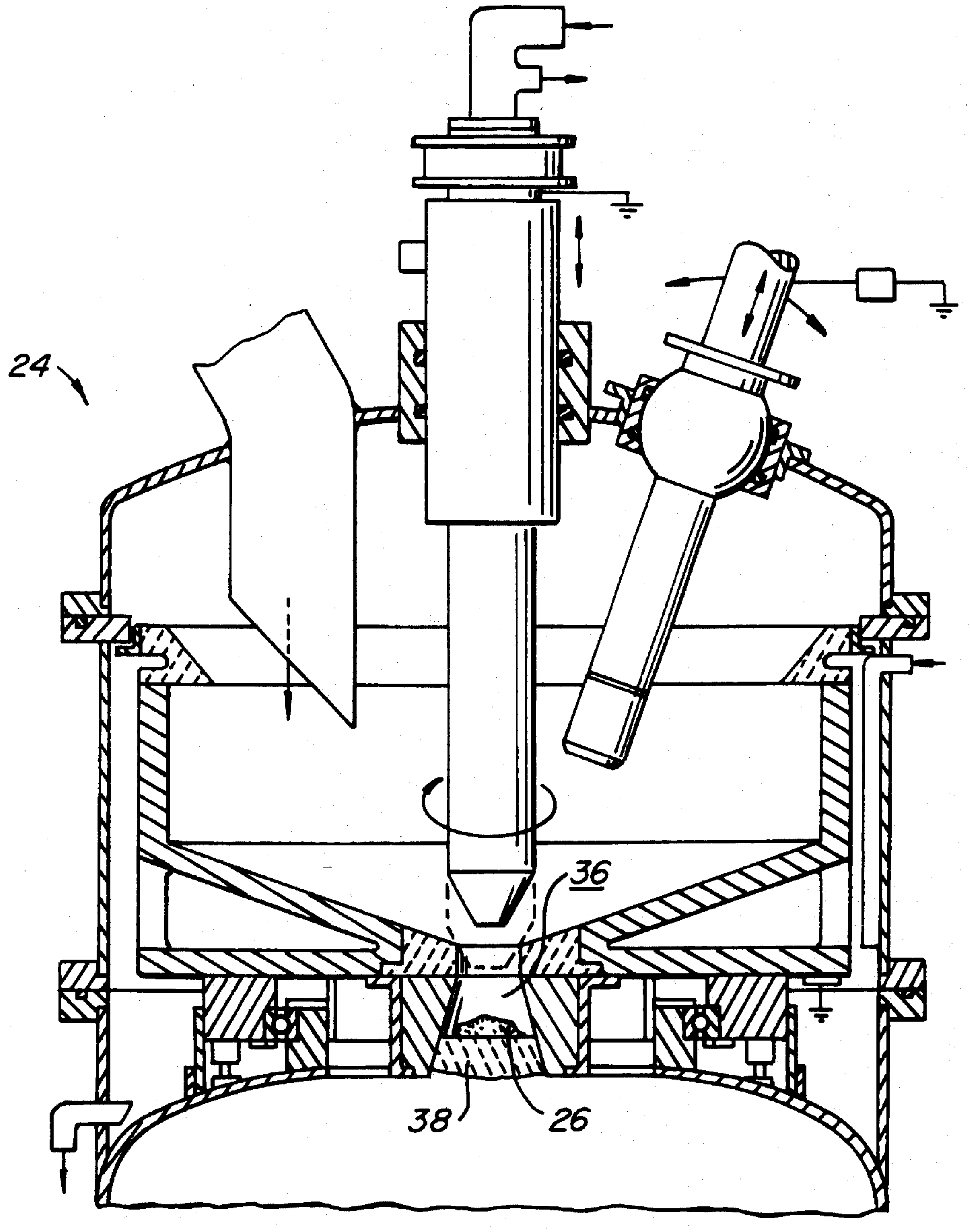
FIG. 4 is a cross-section of a further plasma treatment system containing a slag plug and an ignitable material positioned proximate the slag plug.

Referring now to FIG. 4, a further plasma arc treatment system 2A is shown. Plasma arc treatment system 2A is described in commonly owned U.S. Pat. No. 5,136,137 which has been incorporated by reference. The plasma arc treatment system 2A includes a centrally disposed orifice 36 through which the molten slag 8 is drawn off during operation. During operation and/or a shut down period, a slag plug 38 may form in the orifice 36. The present method and apparatus is also useful in removing the slag plug 38 from the orifice 36. The ignitable material 26 is positioned proximate the slag plug 38 and ignited. The heat energy released melts the slag plug 38 so that a slag flow can pass through the orifice 36. An advantage of the present apparatus and method is that the ignitable material 26 can be positioned in an area which is not accessible with the conventional oxyacetylene or non-transferred arc torches.

Modification and variation can be made to the disclosed embodiments without departing from the subject of the invention as defined by the following claims. For example, the ignitable material may be ignited with magnesium ribbon and the non-reactive material may be simply an amount of aluminum powder in excess of the required amount for reducing the metallic oxide.

What is claimed is:

1. Apparatus for a quick-starting plasma arc treatment system, comprising:

a plasma arc treatment system including a housing, an interior space, an electrical ground, and an electrode, the interior space containing a slag being at a starting temperature which is lower than an electrically conducting temperature, the electrically conducting temperature being a temperature at which said slag conducts electricity between said electrode and said electrical ground;

an ignitable material positioned in contact with the slag and having a self-sustaining reaction upon ignition, said self-sustaining reaction releasing heat energy; and means for igniting the ignitable material and initiating said self-sustaining reaction, said self-sustaining reaction releasing said heat energy and heating at least a portion of said slag to said conducting temperature.

2. The apparatus for a quick-starting plasma arc treatment system of claim 1, wherein:

said igniting means comprises means for generating a pilot arc extending from said electrode toward said electrical ground along a pilot arc path; and said ignitable material being positioned along said pilot arc path and being selected to ignite when contacted by said pilot arc.

3. The apparatus for a quick-starting plasma arc treatment system of claim 2, further comprising:

means for moving the pilot arc path.

4. The apparatus for a quick-starting plasma arc treatment system of claim 1, wherein:

the slag is liquid at the conducting temperature and solid at the starting temperature.

5. The apparatus for a quick-starting plasma arc treatment system of claim 1, wherein:

the plasma arc treatment system includes a material receiving drum, said slag being at least partially supported by said material receiving drum.

6. The apparatus for a quick-starting plasma arc treatment system of claim 5, wherein:

the material receiving drum is rotatable with respect to the housing.

7. The apparatus for a quick-starting plasma arc treatment system of claim 1, wherein:

the plasma arc treatment system further comprises a conductive refractory at least partially supporting the slag.

8. The apparatus for a quick-starting plasma arc treatment system of claim 7, wherein:

the conductive refractory comprises a material selected from the group consisting of graphite, carbon, silicon carbide and tin oxide.

9. The apparatus for a quick-starting plasma arc treatment system of claim 1, wherein:

the ignitable material comprises a metallic oxide.

10. The apparatus for a quick-starting plasma arc treatment system of claim 9, wherein:

the metallic oxide comprises iron oxide.

11. The apparatus for a quick-starting plasma arc treatment system of claim 1, wherein:

the ignitable material comprises aluminum.

12. The apparatus for a quick-starting plasma arc treatment system of claim 1, wherein:

the self-sustaining reaction is an aluminothermic process.

13. The apparatus for a quick-starting plasma arc treatment system of claim 1, wherein:

the ignitable material comprises a non-reactive material which is not consumed in said self-sustaining reaction, said non-reactive material absorbing part of said heat energy thereby reducing a reaction rate of said self-sustaining reaction.

14. The apparatus for a quick-starting plasma arc treatment system of claim 1, wherein:

the ignitable material has an ignition temperature above 1000° C.

15. The apparatus for a quick-starting plasma arc treatment system of claim 1, wherein:

the self-sustaining reaction has a reaction temperature of at least 2000° C.

16. A method of quick-starting a plasma arc treatment system, comprising the steps of:

positioning an ignitable material on a slag contained within an interior of a plasma arc treatment system, the ignitable material having a self-sustaining reaction which releases heat energy, the plasma arc treatment system having an electrode spaced apart from an electrical ground, the slag being at a starting temperature which is lower than an electrically conducting temperature, the electrically conducting temperature being a temperature at which said slag conducts electricity between said electrode and said electrical ground;

igniting the ignitable material and initiating the self-sustaining reaction, said self-sustaining reaction releasing heat energy and increasing the temperature of at least a portion of the slag to at least the electrically conducting temperature; and striking an arc between the electrode and the electrical ground after at least a portion of the slag is at the conducting temperature.

17. The method of quick-starting a plasma arc treatment system of claim 16, wherein:

the igniting step is carried out by striking a pilot arc extending from the electrode and toward the electrical ground; and the positioning step is carried out by positioning the ignitable material along the pilot arc path.

18. The method of quick-starting a plasma arc treatment system of claim 16, further comprising the step of:

selecting the ignitable material so that the self-sustaining reaction is an aluminothermic process.

19. The method of quick-starting a plasma arc treatment system of claim 18, wherein:

the selecting step is carried out so that the ignitable material comprises iron oxide.

20. The method of quick-starting a plasma arc treatment system of claim 16, further comprising the step of:

adding a non-reactive material to the ignitable material, the non-reactive material not being consumed in said self-sustaining reaction, absorbing a part of said heat energy and reducing a reaction rate.

21. The method of quick-starting a plasma arc treatment system of claim 20, wherein:

the adding step is carried out using welding slag containing iron.

22. The method of quick-starting a plasma arc treatment system of claim 16, wherein:

the igniting step is carried out by raising the temperature of the ignitable material to at least 1000° C.

23. The method of quick-starting a plasma arc treatment system of claim 16, wherein:

the positioning step is carried out with the ignitable material having a reaction temperature of at least 2000° C.

* * * * *